June 5, 1973 R. W. SCHUMANN 3,737,328
APPARATUS AND METHOD FOR PREPARING CONFECTIONERY DROPS
Filed Oct. 30, 1970 3 Sheets-Sheet 1

INVENTOR
ROBERT W. SCHUMANN

BY *Eugene M. Bond*
ATTORNEY

INVENTOR
ROBERT W. SCHUMANN

BY *Eugene M. Bond*

ATTORNEY

June 5, 1973   R. W. SCHUMANN   3,737,328
APPARATUS AND METHOD FOR PREPARING CONFECTIONERY DROPS
Filed Oct. 30, 1970   3 Sheets-Sheet 3

INVENTOR
ROBERT W. SCHUMANN

BY *Eugene M. Bond*

ATTORNEY

United States Patent Office 3,737,328
Patented June 5, 1973

---

3,737,328
APPARATUS AND METHOD FOR PREPARING CONFECTIONERY DROPS
Robert W. Schumann, Brookfield, Wis., assignor to W. R. Grace & Co., New York, N.Y.
Filed Oct. 30, 1970, Ser. No. 85,369
Int. Cl. A23g *1/20, 3/00;* B29f *3/01*
U.S. Cl. 99—134 R           8 Claims

ABSTRACT OF THE DISCLOSURE

The invention disclosed is for an apparatus and method for preparing confectionery drops by oscillating wire members traverse through a plurality of extruding streams of confectionery material. Drops severed from the extruding streams by the wire members are received on a conveyor belt where the drops cool prior to packaging.

---

The present invention relates to an apparatus and method for preparing confectionery drops. More particularly the present invention provides an apparatus including at least one oscillating wire member traversing through a parallel of extruding streams of confectionery material such that drops are severed from the extruding stream. The severed drops may be received on a conveyor where they are cooled prior to use or packaging.

Numerous devices are available in the art for preparing confectionery drops such as those employed in baking. Typically, these devices are either complex or necessarily involve great skills for operation in preparing an acceptable product. It has now been found by the practice of the present invention that confectionery drops may be prepared simply, without undue accumulation of confectionery material on the apparatus and in an efficient, effective fashion.

Generally stated, the apparatus of the present invention includes means for containing a confectionery material having a fluidity sufficient for extruding therefrom, a plurality of outlets providing extruding means through which confectionery material passes, at least one oscillating wire member for passing traverse through extruding confectionery material, a conveyor belt for receiving severed drops from the extruded confectionery material, and means for cooling drops disposed on the conveyor.

Generally, the method of the present invention provides means for extruding a confectionery material through a series of outlets, oscillating at least one wire member traverse a plurality of extruding streams of confectionery material to provide severed drops, receiving severed drops from the extruding stream onto a conveyor belt, and cooling the severed drops prior to use or packaging.

The present invention is more fully illustrated by reference to the drawings herein:

FIG. 1 generally illustrates as a perspective view the apparatus and method of the present invention;

Figure 1:
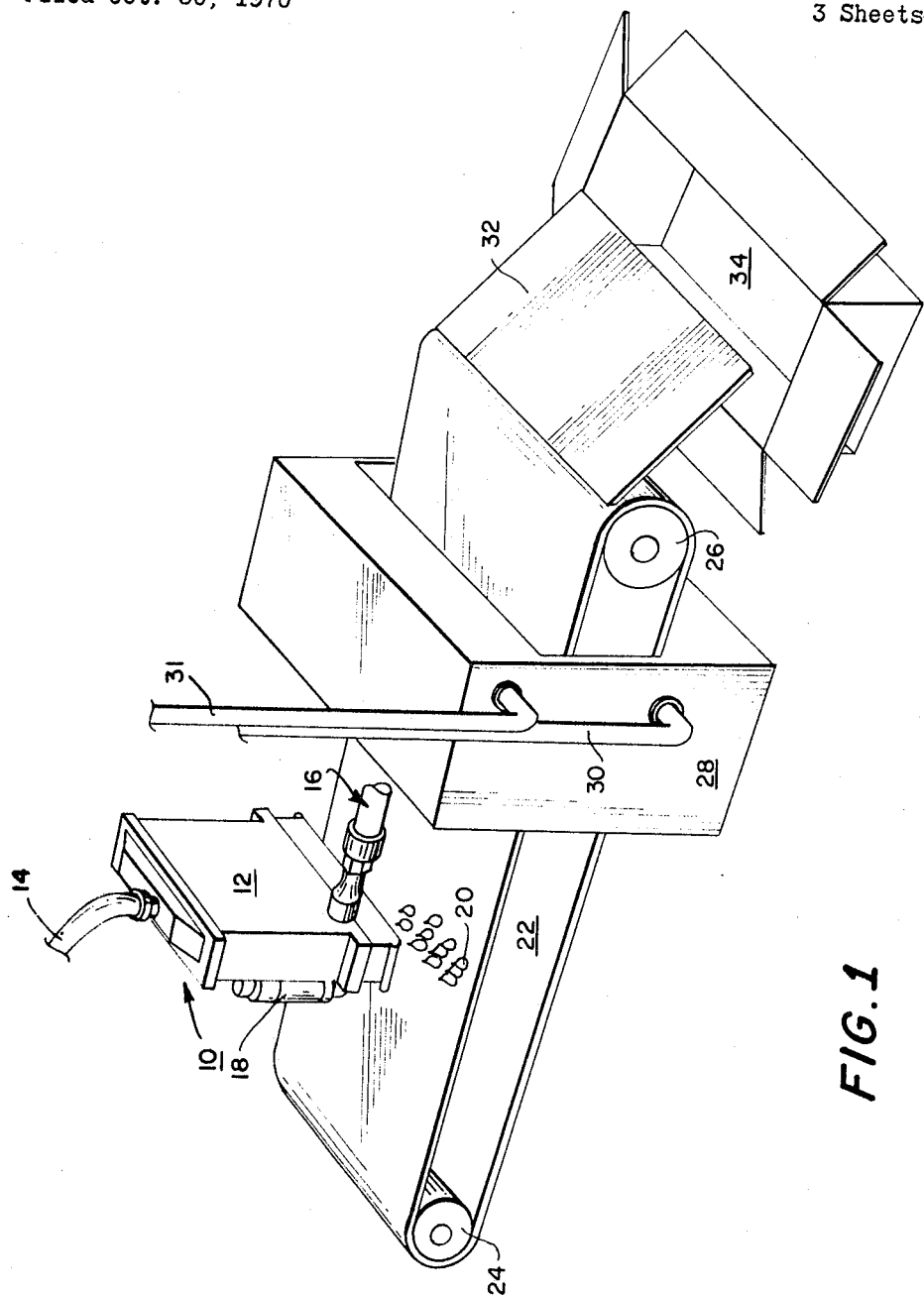

Referring to the drawings wherein similar elements are referred to by similar numbers throughout the several views, FIG. 1 illustrates the method and apparatus of the present invention which includes confectionery holder 12 for receiving confectionery material through line 14 from a supply as required. Temperature control represented by inlet tubing 16 aids in retaining confectionery material in confectionery holder 12 at a state of sufficient fluidity to permit extrusion while being sufficiently rigid to permit severing of an extruded string. Conveniently attached to confectionery holder 12 is drive means 18 for oscillating at least one wire member through a plurality of extruding strings of confectionery material as will be more fully understood hereafter. Drops 20 severed from extruded string of confectionery material are received on conveyor belt 22 desirably formed of material such as stainless steel or the like. Conveyor belt 22 is driven about rolls 24 and 26 and permits the passage of the conveyor belt 22 through air cooler 28. Air cooler 28 having a coolant passing through lines 30 and 31 provides means for cooling confectionery drops disposed on conveyor belt 22 prior to being dislodged by drop releasing plate 32 from which confectionery drops pass to container 34 for packaging.

Figure 2:
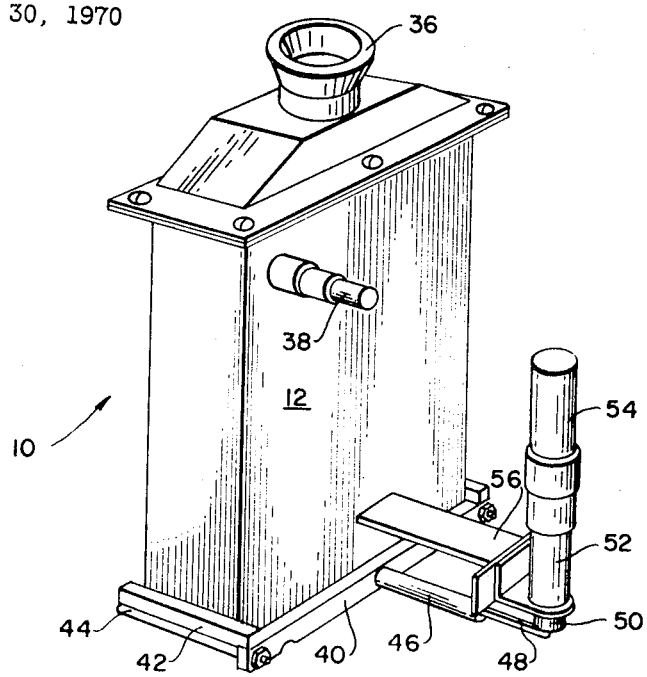
FIG. 2 shows a perspective view illustrating the extruding and severing unit of the present apparatus.
Figure 4:
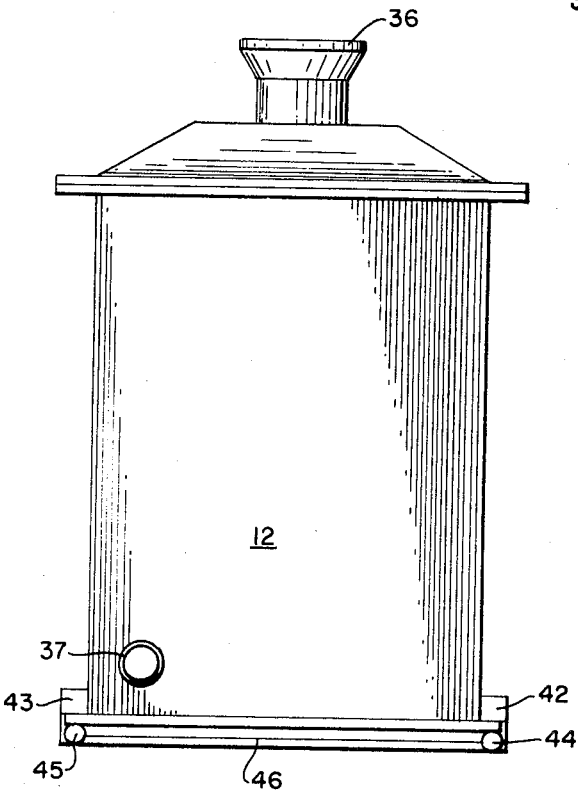
FIG. 4 is a rear elevational view of the unit of FIG. 2.
Figure 5:
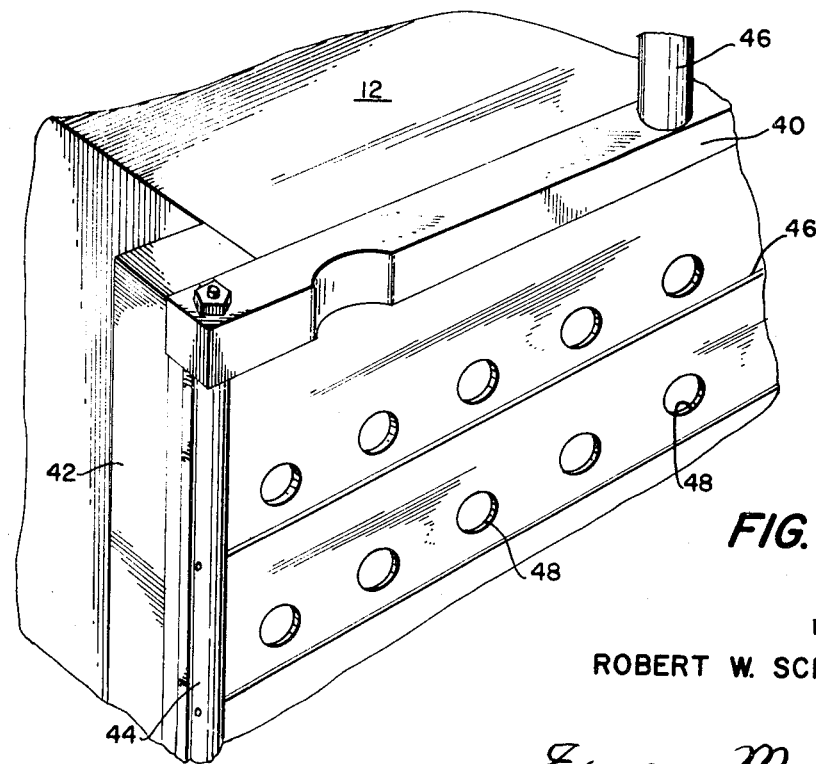
FIG. 5 is a partial perspective view illustrating the wire oscillating members of FIG. 3 in greater detail.

FIG. 2 illustrates confectionery material extruding and severing unit 10 having confectionery holder 12 into which may be received confectionery material through inlet 36. Fluid outlet 38 receives, for example, heated water from inlet 37 passing through a suitable heat exchange means within confectionery holder 12 for heating or maintaining confectionery material at a desired state of fluidity. Confectionery material being extruded from confectionery holder 12 may be severed into drops by a severing means illustrated in FIG. 2 and in greater detail in FIGS. 3–5.

Figure 3:
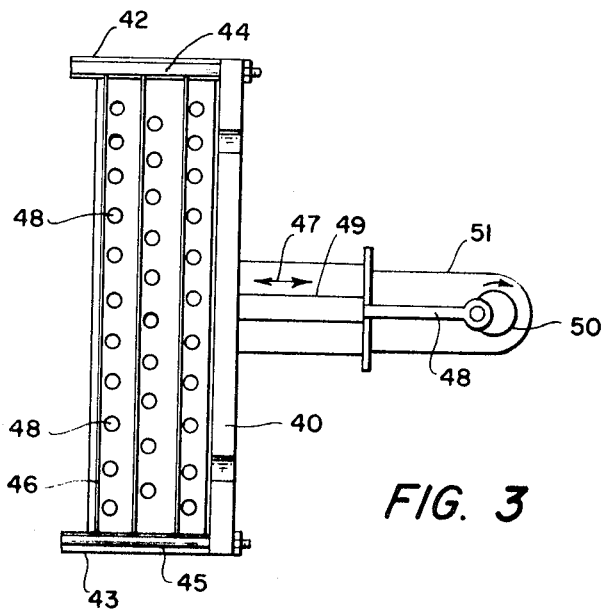
FIG. 3 is a bottom view of the unit of FIG. 2 illustrating in greater detail the oscillating wire members for severing drops from extruded streams.

Confectionery material extruded from confectionery holder 12 is severed by oscillating bar 40 along lines 42 and 43. Disposed near terminal ends of bar 40 are rods 44 and 45 respectively for retaining at least one wire member 46 under tension therebetween. The wire members are positioned out of contact with confectionery material extruding holes 48 which may be included in any desired number and in a plurality of rows, if desired. Conveniently, one oscillating wire member is included for each row of extruding holes 48, and the holes of each row are off-set as illustrated in FIG. 3 so that movement of the wire members will not cause extruding material from one hole to contact extruding material from another hole disposed in an adjacent row.

Bar 40 is oscillated in the direction of arrow 47 by arm 48 through motion of rod 50. Rod 50 is conveniently disposed to a supporting plate 51 which may be conveniently attached to a reinforcing member 56 adequately secured to confectionery holder 12. Oscillation of rod 50 is accomplished by a suitable driven means 52 such as a pneumatic operated motor receiving air pressure through inlet 54. Other convenient drive means may be employed as desired.

Numerous confectionery compositions may be processed using the apparatus and method of the present invention. These materials may be characterized as paste-like confectioneries such as those customarily employed in preparing lozenges, carmel candles, waxed-type chewable candies, bakers' confectioneries including chocolate drops, and the like.

Having described the present invention, it will be readily understood that the foregoing detailed description is given merely by way of illustration and that many variations may be made therein without departing from the invention as defined.

What is claimed is:
1. An apparatus for preparing confectionery drops which comprises:
   (A) means for containing a confectionery material having a fluidity sufficient for extruding therefrom,
   (B) means for extruding a confectionery material through a series of outlets,
   (C) a plurality of outlets providing extruding means through which said confectionery material passes,

(D) at least one oscillating wire member for passing traverse through extruded confectionery material, (E) a conveyor belt for receiving severed drops from the extruded confectionery material, and (F) means for cooling drops disposed on the conveyor.

2. The apparatus of claim 1 wherein the plurality of outlets are disposed as at least three rows having off-set extruding holes in each row whereby contact of extruding material between rows is avoided.

3. The apparatus of claim 1 wherein the conveyor belt passes through a cooling chamber.

4. The apparatus of claim 1 wherein the confectionery is chocolate liquor.

5. The apparatus of claim 1 wherein an air drive means effects oscillation of the wire member.

6. A method for preparing confectionery drops which comprises:
(A) extruding a confectionery material through a series of outlets to form a plurality of streams,
(B) oscillating at least one wire member traverse a plurality of said extruded streams of said confectionery material to provide severed drops,
(C) receiving the severed drops from the extruding stream onto a conveyor belt, and
(D) cooling the severed drops prior to use or packaging.

7. The method of claim 6 wherein the confectionery material is chocolate liquor.

8. The method of claim 6 wherein extruding is effected through a plurality of outlets disposed as at least three rows having off-set extruding holes in each row whereby contact of extruding material between rows is avoided.

References Cited

UNITED STATES PATENTS

| | | | |
|---|---|---|---|
| 488,404 | 12/1892 | Robertson | 107—14 CA |
| 3,574,639 | 4/1971 | Forkner | 99—134 X |
| 1,850,704 | 3/1932 | Brewer et al. | 31—21 |
| 3,239,379 | 3/1966 | Von Drachenfels | 99—134 R X |
| 2,875,069 | 2/1959 | Gilbert et al. | 99—180 R |
| 3,104,975 | 9/1963 | Bowman | 99—81 |

RAYMOND N. JONES, Primary Examiner

J. M. HUNTER, Assistant Examiner

U.S. Cl. X.R.

425—6, 311